Dec. 10, 1963   G. E. F. BOROWKA   3,113,491
PISTON FOR A PISTON PUMP
Filed June 19, 1961
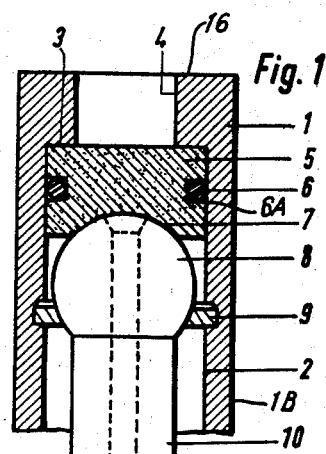
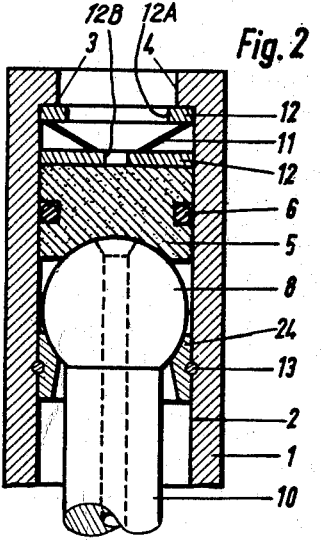
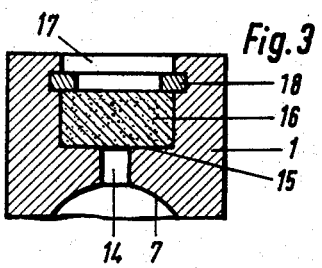
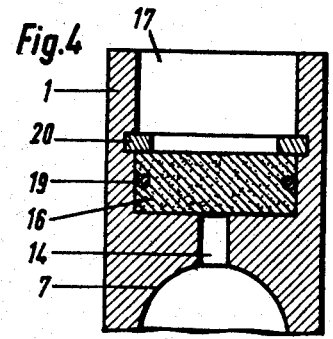
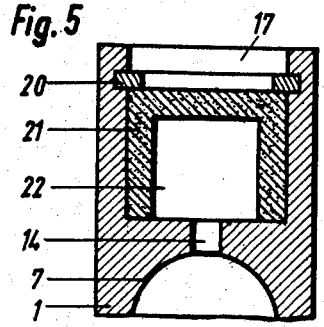
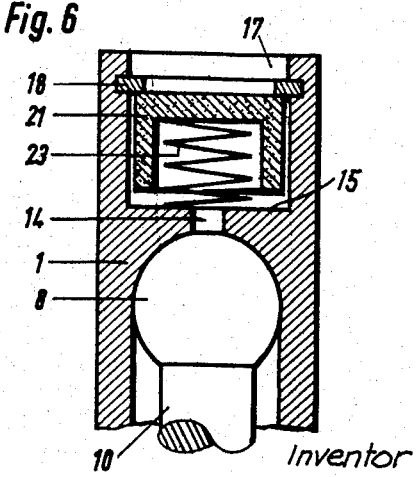
Inventor
GEORG BOROWKA
By Toulmin & Toulmin
Attorneys United States Patent Office 3,113,491
Patented Dec. 10, 1963

3,113,491
PISTON FOR A PISTON PUMP
Georg Emil Franz Borowka, Aschaffenburg, Germany, assignor to Guldner-Motoren-Werke Aschaffenburg, branch of Gesellschaft für Linde's Eismaschinen Aktiengesellschaft, Wiesbaden, Aschaffenburg, Germany
Filed June 19, 1961, Ser. No. 117,892
Claims priority, application Germany June 18, 1960
14 Claims. (Cl. 92—158)

The present invention relates to a piston for a piston pump, more particularly, to a piston for pumping liquid which also acts as a lubricant for the pump with the contact and bearing surfaces of the piston being interconnected to provide a passage for the lubricating liquid.

Piston pumps have been previously constructed without any particular lubricating structure but the liquid being pumped is used to lubricate all the contact surfaces of the piston. However, in those pumps which operate at increased pressures it is difficult to supply a lubricant under sufficient pressure to properly lubricate the bearing and contact surfaces of a piston. As a result, these poorly lubricated areas undergo considerable wear and the life of the pump is greatly decreased.

It has been known to provide a surge chamber in a piston pump which chamber is positioned in front of the head or contact face of the piston. Passage is provided from the contact end to the bearing end of the piston and liquid under pressure is forced through this passage with the bearing end of the piston to lubricate the connection between the upper end of the piston rod and the piston.

This arrangement has the disadvantage in that at high pressures considerable quantities of the pumped liquid flow through the connecting passage between the contact face and the bearing end of the piston. As a result, the quantity of liquid which is pumped by the pump is decreased by the quantity of liquid flowing through this passage. This, in turn, results in a volumetric efficiency which is so low that this type of pump is not practical.

In addition, when such a piston pump has a very low counter pressure because of the rate of flow of liquid through the connecting passage, there will be an insufficient lubrication of the surfaces on the bearing end of the piston.

It is therefore the principal object of this invention to provide a novel and improved piston for a piston pump.

It is another object of this invention to provide a piston having structure for regulating the passage of pumped liquid therethrough in order to properly lubricate the connection between the piston and the piston rod and other contact surfaces.

In order to accomplish the objects of the present invention and to eliminate the disadvantages of prior art constructions the present invention discloses a piston having a connecting passage between the surge chamber in front of the contact end of the piston and the concave bearing recess in the rear of the piston with a restrictor mounted in said passage. The restrictor limits the flow of pumped liquid through this passage so that the loss in the quantity of liquid acted upon by the pump is also limited and the volumetric efficiency is increased.

The restrictor of this invention comprises a porous member formed from sintered material such as powdered metal. The porous metallic mass may be formed from iron, lead or lead alloys. In addition, a powdered plastic mass which is porous may be used as the restrictor. The force exerted by the piston rod on the piston may act upon a bearing surface which is formed on this restrictor. Because of the porous characteristic of the restrictor it will accumulate liquid and as a result the contact surfaces will be continuously wetted by this liquid even when the pump is idle and the surge chamber in front of the piston is empty.

The passage through the piston is in the form of a cylindrical axial bore which is provided with a shoulder upon which the restrictor is retained. A gasket or other sealing means is provided between the periphery of the restrictor member and the wall of the bore to prevent liquid from leaking therethrough.

The restrictor of sintered material can be mounted between the head of the piston rod and the shoulder within the bore by a supporting member such as a snap ring embedded in a groove in the piston. With such a structure the restrictor can be provided with a bearing surface against which the upper end of the piston rod reacts. A resilient element such as a cup-shaped disc spring can be positioned between the restrictor member and the shoulder within the bore.

The shoulder in the bore may be so constructed that the shoulder faces the contact end of the piston which is directed towards the surge chamber. Accordingly, the restrictor member is mounted on the shoulder and held in position by a snap ring. This snap ring can also be constructed in the form of a sealing member so that the ring both retains the restrictor in position and prevents the pumped liquid from leaking around the periphery of the restrictor member. The restrictor member may be so mounted within the bore so as to have a limited amount of sliding movement. This arrangement would provide a cushion in the event of a sudden rise in pressure within the pump delivered through the supply conduit.

Other objects and advantages of this invention will be apparent upon reference to the accompanying description when taken in conjunction with the following drawings, wherein FIGURES 1 through 6 are longitudinal sectional views of a piston constructed in accordance with the present invention and showing several modifications of the restrictor construction.

In describing specific embodiments of the present invention reference will be made to the accompanying drawings wherein like reference symbols indicate the same parts throughout the various views.

In FIGURE 1 there is illustrated a piston 1 having a cylindrical axial bore 2 therethrough. A shoulder 3 is formed within the bore which shoulder faces the bearing end of the piston indicated at 1B. The upper end of the bore has a reduced diameter as indicated at 4 and opens at the contact end of the piston indicated at 1C. The contact end of the piston has an upper end which cooperates with a surge chamber formed in the pump at the head thereof.

A restrictor member 5 is positioned against the shoulder 3. This restrictor comprises a porous member of a sintered material such as powdered metal. A sealing gasket 6 is arranged in a peripherally extending groove 6A in the periphery of the restrictor member 5.

The lower face of the restrictor 5 is provided with a concave and preferably spherical bearing surface 7 which is engaged by a head 8 of a piston rod 10. A snap ring 9 is positioned in a groove in the bore 2 so as to support the head 8 of the piston rod against the bearing surface 7.

Proceeding next to FIGURE 2 there is shown a piston 1 which is similarly provided with a shoulder 3 as described in FIGURE 1. In addition, a resilient cup-shaped disc spring 11 is positioned between two rings or washers 12 one of which engages the shoulder 3 and the other of which engages the upper or contact surface of the restrictor 5. The adjusting rings 12 may have central openings therethrough which are of different diameters, as indicated at 12A and 12B.

The head 8 of the piston rod 10 is supported in this operating position by a supporting structure 24 which is mounted in the bore 2 of the piston by means of a snap ring 13.

In the modification of FIGURE 3 the concave bearing surface 7 for the convex and preferably spherical head 8 of the piston rod is formed in the rear of the piston 1. There is a central bore 14 in the piston which extends from a shoulder 15 which is actually the bottom of a recess or bore 17. A resistor member of a sintered material is indicated at 16 and this member is retained in position by a snap ring 18. The snap ring 18 is also formed to act as a sealing gasket to prevent the pumped liquid from leaking along the wall of the bore 17 between this wall and the restrictor 16.

The modification of FIGURE 4 is essentially the same as the modification of FIGURE 3 with the exception that a sealing gasket or ring 19 is mounted in a groove formed in the outer periphery of the restrictor 16. This gasket 19 has the same function as the snap ring 18 of FIGURE 3 which was also constructed as a gasket. A snap ring 20 is provided for retaining the restrictor 16 within the bore 17. The snap ring 20 accordingly has no sealing function but is merely a retaining member.

Proceeding next to FIGURES 5 and 6 there are illustrated modifications of this invention wherein the restrictor member is provided with a recess at the end facing the bearing end of the piston and the piston rod. This recess serves as a reservoir for the liquid passing through the restrictor and this provides a source of lubricant should the pump be idle for a prolonged period of time and no liquid passes through the restrictor member. Those contact surfaces which must be lubricated will be supplied with a liquid from this recess.

In FIGURE 5 there is illustrated an adapter piston 21 which is porous and is formed from sintered material to function as a restrictor. The adapter piston is retained in the bore 17 by a snap ring 20. A recess 22 is provided in the bearing end of the piston and this recess functions as a reservoir for a liquid seeping through the restrictor. Accordingly, the liquid is conveyed from the recess 22 through the bore 14 to the concave bearing surface 7.

In the modification of FIGURE 6 the adapter piston is mounted in the bore 17 for a limited degree of sliding movement. The adapter piston is supported by a spring acting between the shoulder and the adapter piston. This structure provides for a resilient absorption of any forces which may suddenly occur within the piston pump. Such forces may occur when a sudden surge of liquid is admitted into the pump through a supply conduit.

Such a spring between the restrictor member and the shoulder in the bore can also be arranged to cushion against forces transmitted by the piston rod to the piston through the restrictor member. This latter spring structure will also provide a cushion when the head of the piston rod engages a bearing surface formed directly on the piston and the spring is positioned between the adapter piston and a collar formed within the bore.

In the modification of FIGURE 6 the adapter piston 21 is urged against the retaining ring 18 by a spring 23. In the event there is a sudden pressure increase in the pump chamber in front of the piston 1 the adapter piston 21 will be forced back against the pressure of the spring 23 and will thus provide a cushion for the suddenly applied pressure.

The liquid necessary for lubricating the contact surfaces between the piston rod head 8 and the piston 1 will flow along the wall of the adapter piston 21 in the bore 17. A sufficient clearance (shown exaggerated on the drawing) is provided between the periphery of the adapter piston and the bore so as to provide a connecting passage between the surge chamber in front of the piston and the concave bearing recess in the rear of the piston.

The adapter piston may be formed with a recess in its bearing side and may either be immovably retained within the bore or may be mounted therein for axial displacement within the piston.

Thus it can be seen that the present invention provides several forms of restrictor structures for regulating the flow of pumped liquid between the contact and bearing ends of a piston so as to ensure that a sufficient supply of liquid is always available at the bearing end of the piston for lubricating purposes.

It will be understood that this invention is susceptible to modification in order to adapt it to different usages and conditions and, accordingly, it is desired to comprehend such modifications within this invention as may fall within the scope of the appended claims.

What is claimed as this invention is:

1. A piston for a piston pump wherein the liquid being pumped also acts as a pump lubricant, said piston comprising a body having a contact face in front and a bearing recess in the rear, said contact face cooperating with a surge chamber, there being an inner passageway in said body interconnecting said face and said recess for conveying the pump lubricant to said bearing recess to lubricate the bearing surfaces therein, and a restrictor in said passageway to regulate the flow of the pumped liquid.

2. A piston for a piston pump wherein the liquid being pumped also acts as a pump lubricant, said piston comprising a body having a contact face in front and a concave spherical bearing recess in the rear said contact face cooperating with a surge chamber, there being an inner passageway in said body interconnecting said face and said recess for conveying the pump lubricant to said bearing recess to lubricate the bearing surfaces therein, and a restrictor in said passageway to regulate the flow of the pumped liquid, said restrictor comprising a porous member of sintered material.

3. A piston for a piston pump wherein the liquid being pumped also acts as a pump lubricant, and comprising a body having a contact face and a bearing end with said contact face cooperating with a surge chamber, there being a passage in said body interconnecting said face and said end for conveying the pump lubricant to said bearing end to lubricate the bearing surfaces therein, and a restrictor in said passage to regulate the flow of the pumped liquid, said restrictor comprising a porous member of sintered material, there being a bearing surface on said restrictor.

4. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means defining a shoulder in said bore, and a sintered material member in said bore positioned against said shoulder.

5. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means defining a shoulder in said bore, a sintered material member in said bore positioned against said shoulder, and a sealing gasket positioned at the periphery of said sintered material member.

6. A piston for a piston pump wherein the liquid being pumped also acts as a pump lubricant, and comprising a body having a contact face with said face cooperating with a surge chamber, there being a central bore through said body, means within said bore defining a shoulder therein, a sintered material member positioned in said bore and acting as a restrictor for liquid passing therethrough, said member having bearing surfaces for a piston rod, and means supporting said sintered material member in said bore between the piston rod and said shoulder.

7. A piston as claimed in claim 6 wherein said supporting means comprises a cup-shaped disc spring.

8. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means in said bore defining a shoulder therein facing towards said contact face, a sintered material member in said bore against said shoulder for restricting the flow of liquid through said bore, and a snap ring retaining said sintered material in position against said shoulder.

9. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means in said bore defining a shoulder therein facing towards said contact face, a sintered material member in said bore against said shoulder for restricting the flow of liquid through said bore, a supporting element retaining said member in position against said shoulder, said supporting element comprising a sealing member to seal against the passage of the pumped liquid past said sintered member.

10. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means in said bore defining a shoulder therein facing towards said contact face, a sintered material member in said bore against said shoulder for restricting the flow of liquid through said bore, a supporting element retaining said member in position against said shoulder, there being a recess in said sintered member in the side thereof directed towards said bearing end of the piston.

11. A piston for a piston pump wherein the liquid being pumped also acts as a pump lubricant, and comprising a body having a contact face and a bearing end with said contact face cooperating with a surge chamber, there being a cylindrical axial bore through said body interconnecting said face and said end, means in said bore defining a shoulder therein facing towards said contact face, a sintered material member in said bore against said shoulder for restricting the flow of liquid through said bore, and spring means for retaining said sintered material member against said shoulder.

12. A piston for a piston pump wherein the liquid being pumped also acts as a pump lubricant, and comprising a body having a contact face and a bearing end with said contact face cooperating with a surge chamber, there being an axial bore extending through said body from said face to said end, means in said bore defining a shoulder therein facing towards said contact end, an adapter piston slidably mounted in said bore between said shoulder and said outer end, means in said bore for limiting the sliding movement of said adapter piston, and spring means biasing said adapter piston against said limiting means so that a space is formed between said shoulder and said adapter piston.

13. A piston for a piston pump wherein the liquid being pumped also acts as a pump lubricant, and comprising a body having a contact face and a bearing end with said contact face cooperating with a surge chamber, there being an axial bore extending through said body from said face to said end, means in said bore defining a shoulder therein facing towards said contact end, an adapter piston slidably mounted in said bore between said shoulder and said outer end, means in said bore for limiting the sliding movement of said adapter piston, and spring means biasing said adapter piston against said limiting means so that a space is formed between said shoulder and said adapter piston, there being a recess in the bearing end of said adapter piston.

14. A piston for a piston pump wherein the liquid being pumped also acts as a pump lubricant, and comprising a body having a contact face and a bearing end with said contact face cooperating with a surge chamber, there being an axial bore extending through said body from said face to said end, an adapter piston slidably positioned in said bore, means within said bore for limiting the sliding movement of said adapter piston, there being a clearance between the wall of said bore and the outer surface of said adapter piston so that the lubricating liquid can flow from the contact end of said piston to the bearing end thereof.

References Cited in the file of this patent

UNITED STATES PATENTS

| | | |
|---|---|---|
| 2,300,009 | Rose | Oct. 27, 1942 |
| 2,409,057 | Meinke | Oct. 8, 1946 |